United States Patent [19]
Anderson et al.

[11] 3,875,325
[45] Apr. 1, 1975

[54] TELEPHONE SPLICE CLOSURE
[75] Inventors: Charles Victor Anderson, Doraville; Mills Lawrence Fleming, Lawrenceville; George Anthony Kotzias, Doraville; Robert Rogers Ross, Gainesville; James Luchin Williams, Doraville, all of Ga.
[73] Assignees: Western Electric Company, New York, N.Y.; by said Anderson, Fleming and Kotzias; Bell Telephone Laboratories, Incorporated, Murray Hill, N.Y.; by said Ross and Williams
[22] Filed: June 10, 1974
[21] Appl. No.: 477,598

[52] U.S. Cl................ 174/92, 174/76, 174/78, 174/88 R, 339/14 R
[51] Int. Cl............................................ H02g 15/08
[58] Field of Search...... 174/76, 77 R, 88 R, 91–93, 174/138 F, 21 R, 74 A, 78; 339/14, 115 C, 116 C

[56] References Cited
UNITED STATES PATENTS
2,803,696 8/1957 Hefner.......................... 174/92 X
3,054,849 9/1962 Colbert........................... 174/92
3,636,241 1/1972 Baumgartner et al............. 174/92

FOREIGN PATENTS OR APPLICATIONS
117,776 5/1930 Austria......................... 174/138 F
1,490,809 6/1969 Germany........................ 174/92

Primary Examiner—Darrell L. Clay
Attorney, Agent, or Firm—C. E. Graves

[57] ABSTRACT

This multipair telephone cable splice closure is especially useful with filled cable. The closure is double ended and consists of two mating shells which have tapered end mouths to accommodate a range of cable outside diameters. A stiffening member in the form of a one-piece open-center bar permits cables to be fastened within the closure in various advantageous configurations. Several options for filling the closure are described.

11 Claims, 14 Drawing Figures

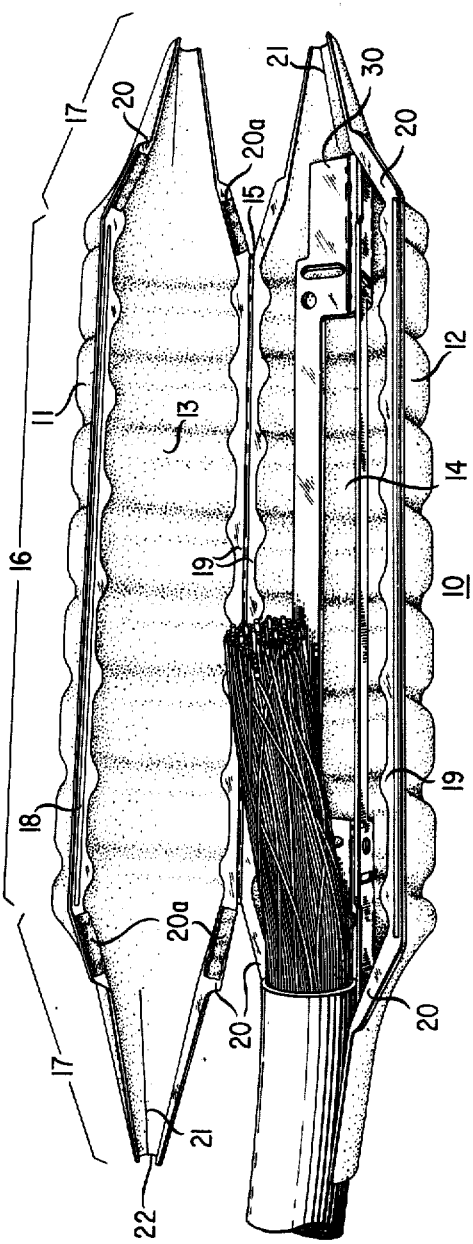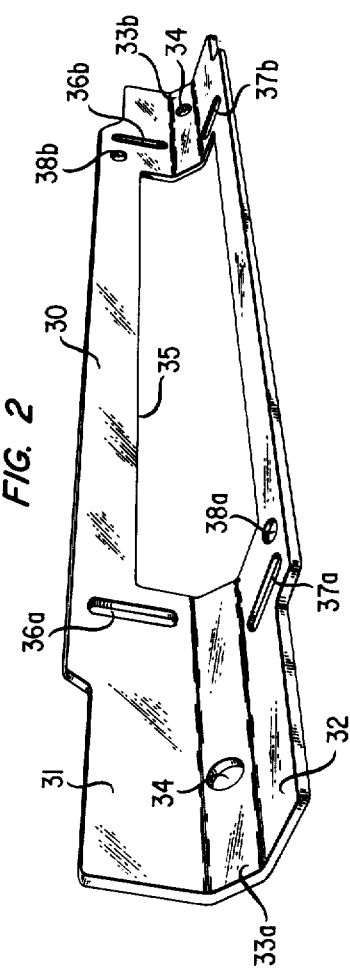

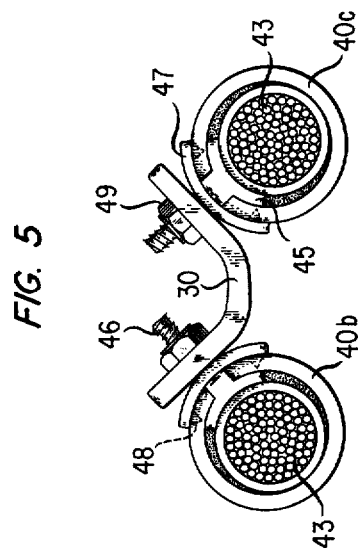
FIG. 3
FIG. 4
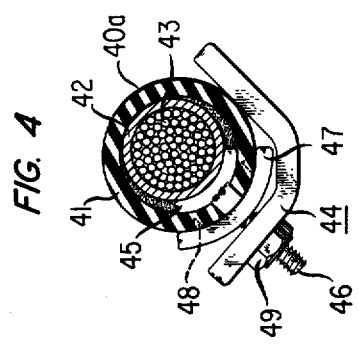
FIG. 5
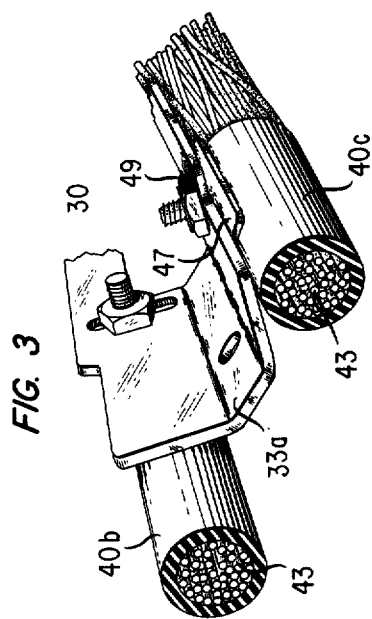
FIG. 6
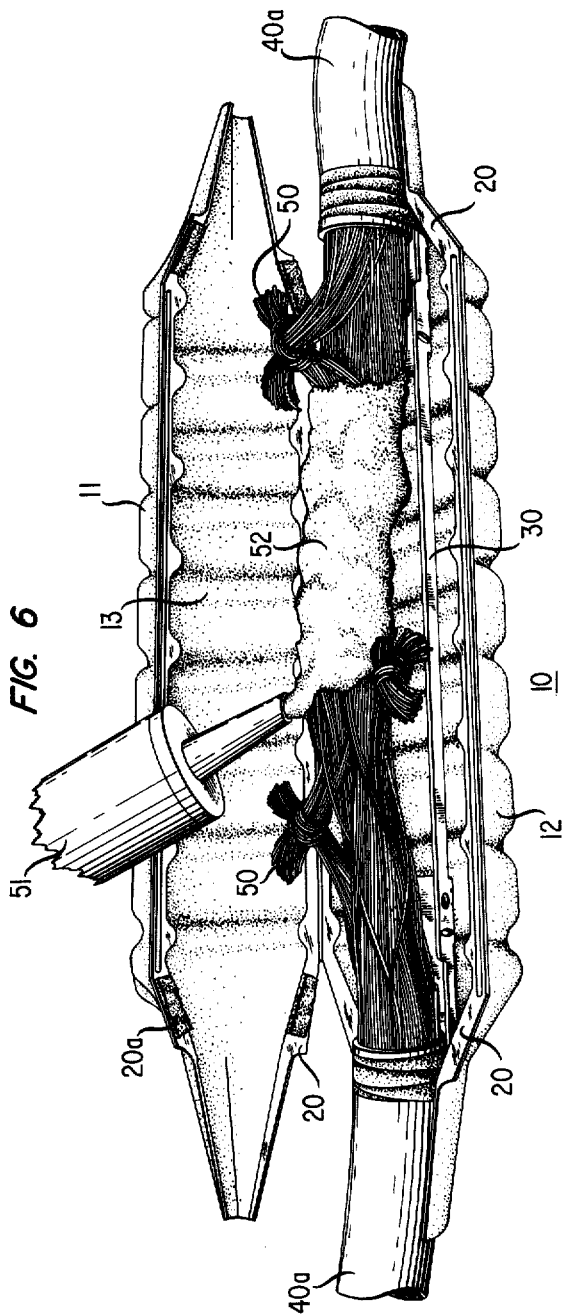

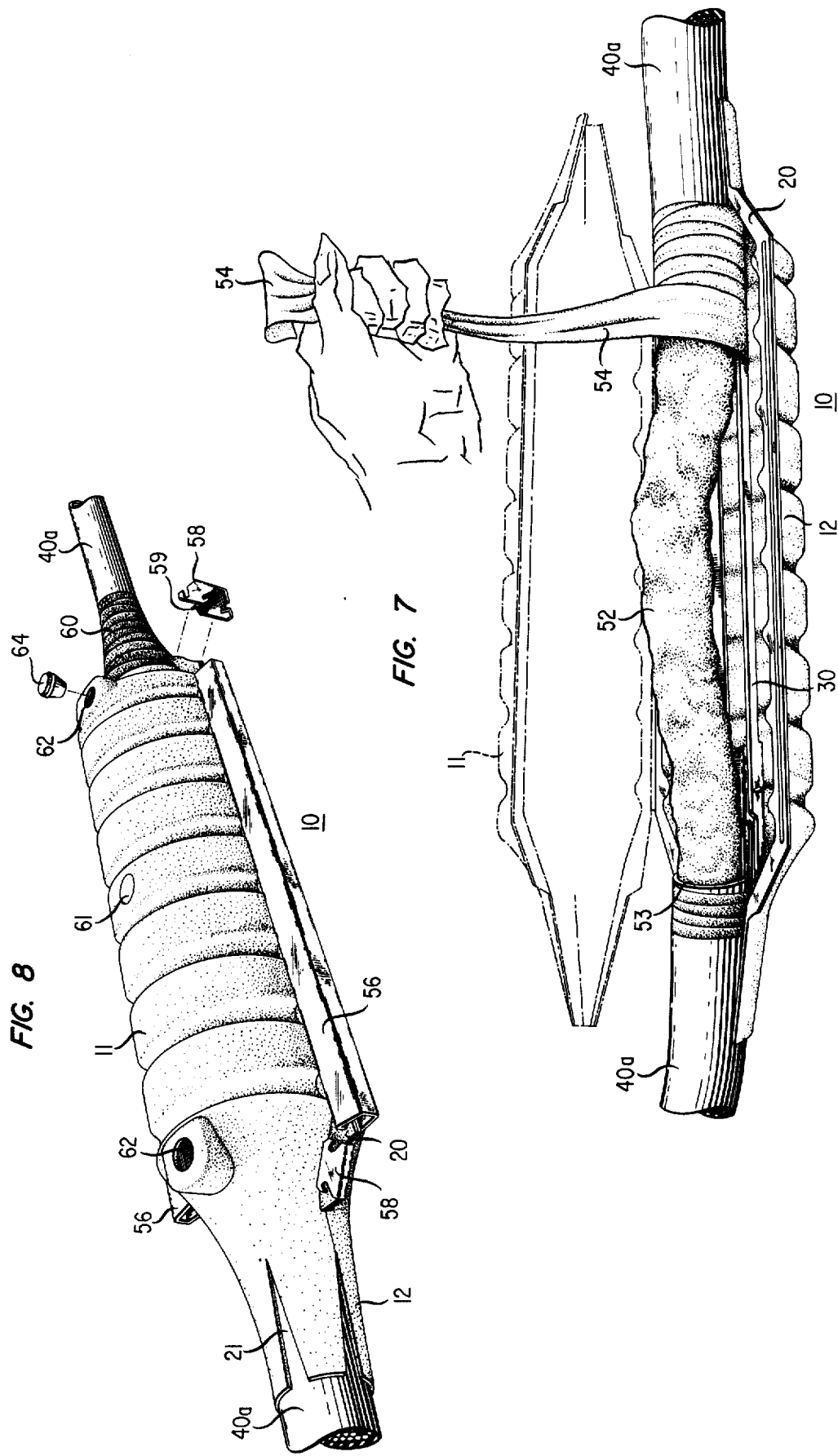

3,875,325

TELEPHONE SPLICE CLOSURE

FIELD OF THE INVENTION

This invention is addressed to achieving reliable electrical conductor splice points. In particular, the invention concerns a closure useful at the splice point of multipair telephone cables.

BACKGROUND OF THE INVENTION

Watertight integrity of plastic insulated conductor cables has been increasingly recognized as crucial to realizing the high quality communications service of which modern equipment is capable. Thus, in recent years much of the plastic insulated conductor cable intended for direct burial which was heretofore "air core," has been filled with greaselike substances to preclude entry of water through breaks in the sheath or otherwise.

For cable systems to be fully watertight, however, the splice closures themselves must likewise be filled. This requirement bears heavily on the design concepts of the closure itself.

Specifically, along with the usual requirements of low cost, ruggedness, and supplying of adequate electrical and mechanical sheath continuity, a splice closure which is to be filled with grease must be simple in design. At the same time, it is desirable for a single design of closure to accommodate many different cable sizes. Further, the cable pairs must be connectable as straight splices, butt splices or branch splices.

SUMMARY OF THE INVENTION

These objects are achieved by a double-ended cable closure comprising two mating half-shells hinged together to make a one-piece cover with each end having a tapered mouth with longitudinal slits to accommodate a range of cable diameters, and a stiffening member in the form of a one-piece open-center bar.

Pursuant to the invention the bar is longitudinally angled to supply bending resistance in all directions. Since the fill must be free to flow, the bar is also opened widely at its center so as not to impede the flow. The construction nonetheless provides ample bending resistance. The bar receives single cables within its angle, or two cables along the two outside surfaces of the bar. The bar and sheath clamps serve to mechanically and electrically tie cable stubs.

Advantageously, the shells define semicylindrical interior cavities, and mate along flat outside peripheral edges. Each end mouth is a tapered half-cone, slit lengthwise in one or more places to enable it to flare out to assume various shapes and even to accept two or more cables. In one embodiment, one of the mating shells is supplied with one or more air vent holes at each end, and also a fill hole midway between the ends. Longitudinal clamps are applied to grip the edges of the two shells together. The fill then is pumped into the fill hole and flows both ways toward the end mouths, displacing air. The closure is reenterable by removing the clamps.

In a further embodiment, an inner sleeve is included around the splice. Using a nozzle that extends through the outer shell, fill is introduced directly into a central region of the sleeve. The fill flows both ways away from this region, expelling the air as it does. The fill then flows back between the sleeve and the inner skin of the mating shells, doubling back toward the point of entry where the air is being evacuated. This embodiment affords enhanced protection against air entrapment.

The invention, its features and advantages will be readily discerned from a reading of the detailed description to follow taken into conjunction with the drawing in which:

BRIEF DESCRIPTION OF THE DRAWING

FIG. 1 is a frontal schematic perspective view showing an exemplary closure open and with tie bar;

FIG. 2 is a schematic perspective diagram of the tie bar alone;

FIG. 3 is an end perspective view illustrating connection of cables to the tie bar;

FIGS. 4 and 5 are end schematic views of the tie bar mounting a telephone cable within its angle or to outside surfaces;

FIG. 6 is a partial front schematic view of the closure, tie bar, and splice cables being assembled;

FIG. 7 is similar to FIG. 6 and shows a later stage of preparation;

FIG. 8 is a front schematic perspective view of the closure with splices completed and cover closed;

DETAILED DESCRIPTION OF ILLUSTRATIVE EMBODIMENT

Figure 10:
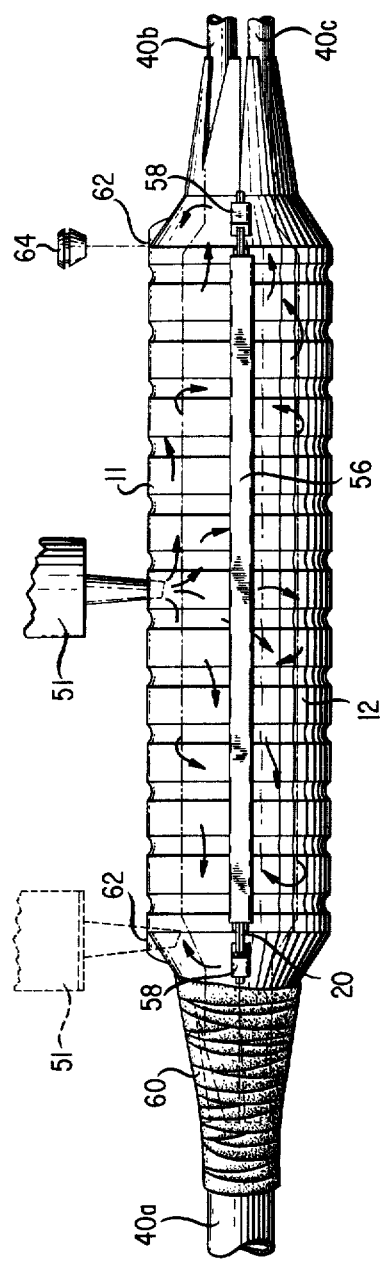
FIG. 10 is a side view of the closure with cables installed and showing the filling operation.

The closure depicted 10 and seen in FIG. 1 consists of an upper shell 11 and a lower shell 12. Their interiors define semicylindrical cavities 13, 14 respectively. Advantageously, although not necessarily, the shells are constructed of molded plastic and are joined along a common edge or hinge 15 seen also in FIG. 9. If, as is advantageous, the two shells 11, 12 are molded as a single unit, the hinge 15 is a section of the same plastic. The shells 11, 12 when in mating relation define a generally cylindrical elongate chamber 16. For added strength, each shell 11, 12 includes a series of corresponding inwardly extending circumferential ribs 17.

At each end of each shell 11, 12 beyond the ribs 17 which define the chamber 16, there is formed a tapered mouth 17 which has the shape of a bifurcated or half-cone. Flat, planar lengthwise edges 18, 19 extend out from the rims of the shells 11, 12. The edges 18, 19 are continued as converging lips 20 which extend about halfway out along the tapered mouth 17. The two shells 11, 12 mate along the corresponding edges 18, 19 and the lips 20. Advantageously, a small block of foam tape 20a is provided on each lip 20. Each mouth 17 includes one or more lengthwise slits 21 running from the end 22 inwardly substantially to a point where the lips 20 end.

The closure 10 advantageously is made out of a plastic material having the characteristics of low creep, good impact strength, good solvent resistance, corrosion resistance, and resistance to microorganisms. A further advantageous property is translucence, so that craftsmen can visually observe the progress of the filling operation. One plastic which meets the above requirement is polypropylene copolymer.

A tie bar, designated 30, is pictured in FIG. 2. It is formed from one piece of metal, advantageously aluminum, and consists of two flat members 31, 32 which are joined at right angles to each other by flanges 33a and 33b. The flanges are made wide enough to accommodate a through hole such as 34. An elongated center section of tie bar 30 is cut out to form a wide opening 35, through which cable conductors fill material or encapsulant may readily pass. The ends of each of sides 31, 32 are stepped down at a point denoted 67.

The tie bar members 31, 32 respectively include slots 36a, 36b, and 37a, 37b, located as shown in FIG. 2 beyond the opening 35. The slots desirably run at right angles to the bar's lengthwise direction. Holes 38a, 38b inwardly of the slots 37a and 36b respectively, are provided in order to accommodate ground wire connection or connection to service wire shields.

Multipair telephone cables are attached to the tie bar 30 as shown for example in FIGS. 4 and 5. In FIG. 4, a single cable 40a consisting of an outer plastic jacket 41 and an inner metallic sheath 42 surrounding a cable core 43 of paired conductors, is advantageously contained within the angle of tie bar 30, the sheath 42 being gripped by a conventional bonding clamp 44. The latter consists of a curved inner shoe 45 attached to a threaded stud 46, and a curved outer plate 47 riding on stud 46 which has two rows of tangs 48. The outer plate 47 is placed around stud 46, and the stud is placed into one of the tie-bar slots such as slot 36a seen in FIG. 2. When nut 49 is tightened, the tangs 48 penetrate the outer jacket 41, the shoe 45 and plate 47 are drawn together, and the entire assembly becomes rigidly affixed to tie bar 30. The assembly is then taped together for additional rigidity.

A single cable end is thus affixed within the tie bar 30, as seen in FIG. 4; or, two cables such as cables 40b and 40c of FIGS. 3 and 5 can be affixed to one end of tie bar 30 by mounting them outside the tie bar. The sheath clamping and taping are the same in either case.

Using the closure 10, the tie bar 30, and the cable sheath gripping method so far described, a splice is built up as illustrated beginning with FIG. 6. Two multipair cables both designated 40a and preferably both filled themselves with material such as described in M. C. Biskeborn et al. U.S. Pat. No. 3,607,487 (assigned to applicants' assignee), are prepared and attached to opposite ends of the tie bar 30 in the manner described. Corresponding conductors of these cables are joined with wire connectors 50. Advantageously, groups of the spliced conductors are bundled for good housekeeping. With splicing completed, the bottom shell 12 is placed around the assembly and filling compound 52 is introduced into and around the spliced bundle by an injector such as 51 or other suitable means. The compound may be petroleum jelly, or a gelled mineral oil such as described in the copending application of D. P. Dobbin et al. Ser. No. 444,344, and assigned to applicants' assignee. Other agents will be satisfactory which will stay semisolid or greaselike over a wide range of temperature without dripping, which are easy to apply, are immixable with water and flow readily into and around the splice areas to afford protection.

The fill 52 is worked into the splice bundle thoroughly and right up to the sheath stub end 53 as seen in FIG. 7. Advantageously then, a length of serving tape 54 which desirably is an open mesh fiber member is wrapped around the pregreased splice bundle, from one end to the other. The tie bar 30 is included in the wrapped splice. The two mating shells 11, 12 are now brought together as shown in FIG. 8.

Figure 9:
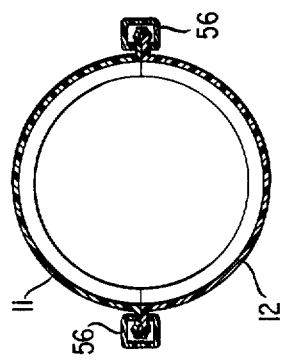
FIG. 9 is a side sectional view showing the cover closed and the closing clamp in place.
Figure 9A:
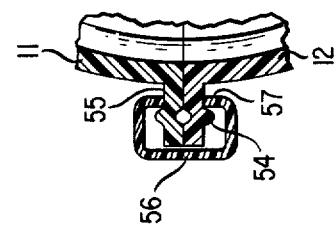
FIG. 9A is a side sectional detail of a fastened pair of shells.

As seen in FIG. 9, elongated lengthwise-running ridges 54 are included on the outside surfaces of edges 19. The ridges 54 are located so that a clearance region 55 exists between them and the outer skin of each of the shells 11, 12. An elongated resilient three-sided channel 56 with inwardly extending opposed clamping surfaces 57, is slid over the edges behind the ridges 54 as seen in FIG. 9, one clamp on each side of the closure. Advantageously, so as to lock or lodge the surfaces 57 behind the ridges 54, only a slight clearance is afforded in the space 55 as seen in FIG. 9A. The channel 56 thus fastens the two shells 11, 12 together along the edge portions 18, 19. Then, metallic clips 58 with inwardly extending tangs 59 are placed on the lips 20. The clips 58 are closed as with pliers, to drive in the tangs 59 and seal the lips 20.

FIG. 8 illustrates how the slits 21 widen out so that the mouths 17 accommodate to the outside diameter of cable 40a. At this point, vinyl or other tape is applied in helical wraps designated 60 around the cable 40a and the cover end, as seen in FIG. 8. Now, the final charge of filling compound is placed into the closure 10 by inserting the injector 51 through a central circular fill hole 61. Two venting ports 62 as seen in FIG. 9 are open at this time. Of course, either venting port can also be used as a fill hole if desired. The fill flows away from the central region toward the ends of the closure as shown by the arrows 63. Air escapes through the venting ports; and when the closure is completely filled, plugs 64 are inserted into the ports. Two holes only pump from one end to the other.

FIG. 10 illustrates an optional way of placing fill within the closure 10. The clamp 56 holding the non-hinged edges is severed at its midpoint and the two halves are slid away from each other. The nozzle 51 is then forced between the mating shells and into the interior. Fill may thus be applied more directly to a wider range of interior regions within closure 10 in this fashion.

Figure 11:
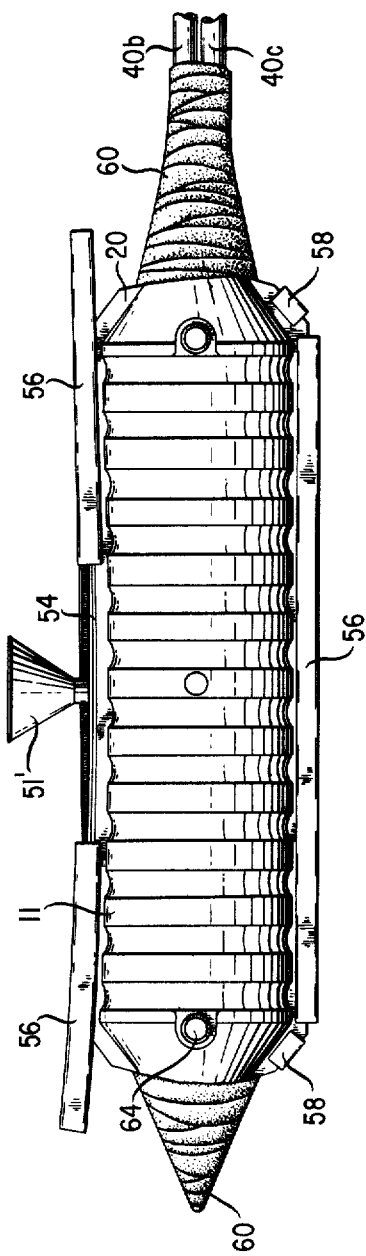
FIG. 11 is a top view of the closure showing an alternate way of injecting the fill.
Figure 12:
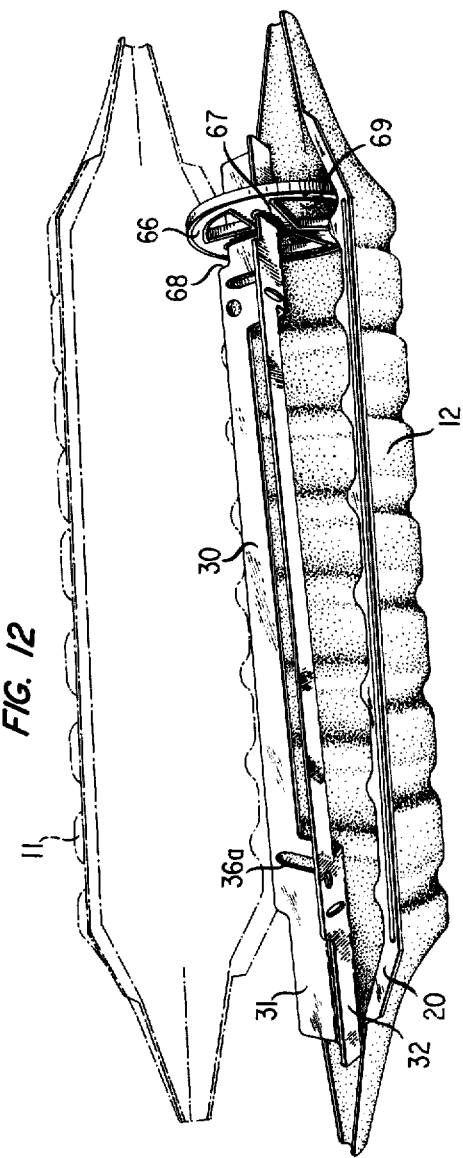
FIG. 12 is a partial frontal perspective diagram showing the closure with a butt splice adapter in place.

FIGS. 11 and 12 illustrate how closure 10 can be used for butt splicing. Two cables again denoted 40b, 40c are brought through a common end of the closure and prepared as described earlier in connection with FIGS. 3 and 5 for attachment to one end of the tie bar 10. The tapered mouth 17 of the remote end in this instance is tied tightly down on itself so as to form a relatively closed nose which is taped shut. To support the tie-bar end adjacent to the closed-down nose, an adapter 66 is provided. Adapter 66 is advantageously circular around its periphery and includes a V-slot 67 that tightly receives the like-shaped end of the tie bar, up to but not beyond the step 68 of the tie-bar edges. Adapter 66 also includes several through-holes 69 which allow the fill 52 to pass through them to more fully occupy the nose section. Adapter 66 has a diameter that snuggly fits behind the last inwardly extending rib 17a and is held in place thereby.

In all cases after the closure is secured with the cables in place, the splices made, and the filling operation completed, it is desirable to wrap several further turns of electrical tape around the outside surface of the closure at two or three places.

The closure 10 may be also used with air-core cable in various ways that will be evident to those skilled in the art.

Figure 13:
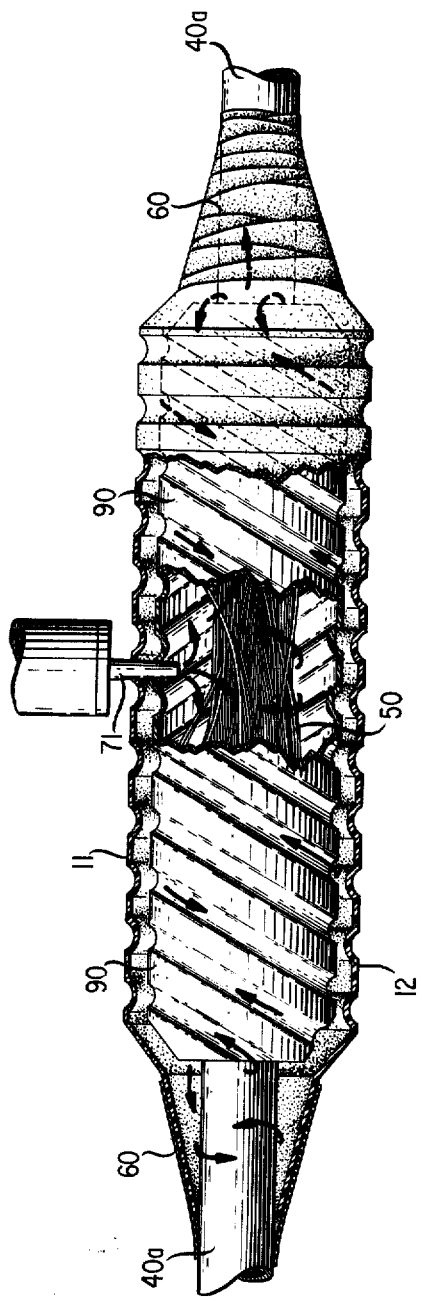
FIG. 13 is a side perspective view showing a further embodiment of the invention.

In the further embodiment of FIG. 13, the bundle is prepared as described, and an inner cylindrical sleeve 70 with a central circular entrance 71 in alignment with the fill hole 61 is first placed around the splice bundle. The sleeve 70 desirably extends the full length of the inner cavities of the shells. The sleeve 70 also is provided with a series of ribs 72 on its outside surface, which are at a substantial angle, for example 45°— to the axis of the sleeve. The ribs 72 may be in contact with the inwardly extending ribs of the shells 10, 11.

Fill is introduced with pressure through the entrance 71 into the inner sleeve, and flows in both directions toward the sleeve ends. In this embodiment, the air venting holes 61a are located adjacent to the fill hole 61, as shown in FIG. 8. The fill occupies the available space in the inner sleeve, then fills the mouth regions and finally under force of the hydraulic pressure doubles back flowing between the outer surface of the sleeve 70 and the inner skin of the shells 10, 11. In this phase, the fill is guided helically by the ribs 72, to assure that fill is distributed all around the sleeve 70. When the fill emerges from the vent hole 61a, the pumping is stopped and the closure is completed as described.

The spirit of the invention is embraced in the scope of the claims to follow.

What is claimed is:

1. A splice closure for enclosing a splice of multipair telephone cables, comprising:
    first and second elongate shells each including
        a semi-cylindrical interior cavity;
        two end mouths each shaped as a tapered half-cone and each mouth including at least one inwardly extending slits;
        flat planar edges extending outwardly from the rims adjacent said cavity in parallel relation and in converging relation beyond said cavity; means matably securing said first and second shells along their respective said edges; and
        a rigid bar disposed within said shell for supporting cables and splices within the mated shells, comprising:
            first and second flat members joined at an angle to each other by end flanges;
                the area between said end flanges and said sides defining an elongate opening capable of passing gel-like fill therethrough.

2. A splice closure pursuant to claim 1, wherein at least one of said shells further includes a circular entrance hole to its interior cavity located substantially at the shell midsection; and venting ports at both ends of said cavity.

3. A splice closure pursuant to claim 2, wherein said circular entrance hole and both said venting ports are in the same shell and located in a line midway from the shell rims.

4. A splice closure pursuant to claim 1, wherein said first and second shells are plastic elements joined together in self-hinging relation along a common edge consisting of one of said first shell's long edges and a corresponding edge of said second shell.

5. A splice closure pursuant to claim 4, wherein the outside surfaces of the parallel portion of said first shell edges and said second shell edges include elongated straight ridges; and wherein said securing means includes first and second elongated resilient channels each with opposed clamping jaws, each said channel fitting around a respective corresponding pair of mating shell edges with said jaws lodged between the corresponding said ridges and the skins of said shells.

6. Apparatus pursuant to claim 5 wherein the interior cavity of each said shell further includes plural inwardly-extending semicircular ribs.

7. Apparatus pursuant to claim 6, further including an open-ended inner sleeve within said two shells encircling said bar and extending substantially the length of said inner cavities, said sleeve including a central circular entrance to receive fill therethrough so that when fill is so introduced said fill will flow in both directions within said sleeve away from said entrance and said ends and then back between said sleeve outer surface and said shells' inner surface, at least one of said shells including a central venting port whereby air can be forced out said venting port by movement of said fill.

8. An enclosed cable splice comprising:
    a splice closure comprising:
        first and second elongate mating shells each having
            a semicylindrical interior cavity,
            an end mouth at each end of said cavity, shaped as a tapered half-cone and each mouth including at least one slit,
            flat parallel planar edges extending outwardly from the rims of each said shell along the length of said cavity and converging toward each other therebeyond,
        the two outward-facing parallel portions of both said first shell edges and said second shell edges including elongated straight ridges,
        first and second elongated resilient channels each with opposed clamping jaws, each said channel fitting around a respective corresponding pair of mating shell edges, with said jaws lodged between the corresponding said ridges and the adjacent shell skin,
        a tie bar disposed within said interior cavities and extending therebeyond comprising:
            first and second flat members joined at substantially right angles to each other by end flanges;
            the area between said flanges and said sides defining an elongated opening;
    at least one multipair telephone cable extending through the end mouths and into the interior between said mating shells;
    said end mouths conforming to the outside diameter of said at least one cable;
    means securing each said cable to an end of said tie bar;
    splicing connections attached to at least some of the pairs of said at least one cable;
    means loosely holding said spliced pairs to said tie bar; and
    a gel-like material, substantially surrounding said splicing connections and filling the volume between said mating shells.

9. Apparatus pursuant to claim 8 further including tape means tying down said slit mouths to said cable exterior.

10. Apparatus pursuant to claim 8, wherein at least one cable extends into said slit mouths at either end of said closure.

11. Apparatus pursuant to claim 8, further comprising a circular member within said shells and held between two adjacent and corresponding pairs of semicircular ribs of said shells, and including a first cut-out substantially the same cross-section as the end of said tie bar; and at least one further cut-out capable of passing said gel-like material therethrough.

* * * * *